Feb. 19, 1924.  1,484,179
H. A. McCLURE ET AL
DOUGHNUT MACHINE
Filed Sept. 24, 1921  3 Sheets-Sheet 1
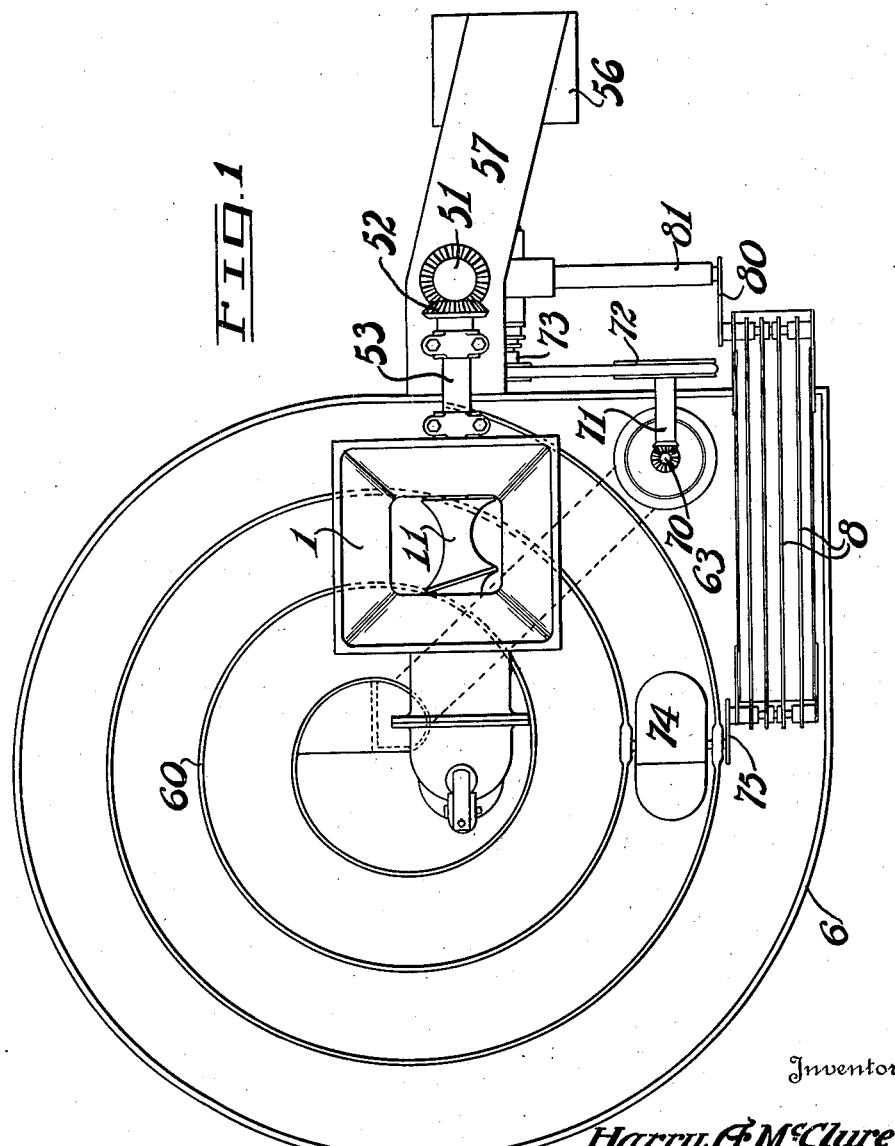
Inventors
Harry A. McClure
Henry F. Huntley
By H.L.&C.L. Reynolds
Attorneys

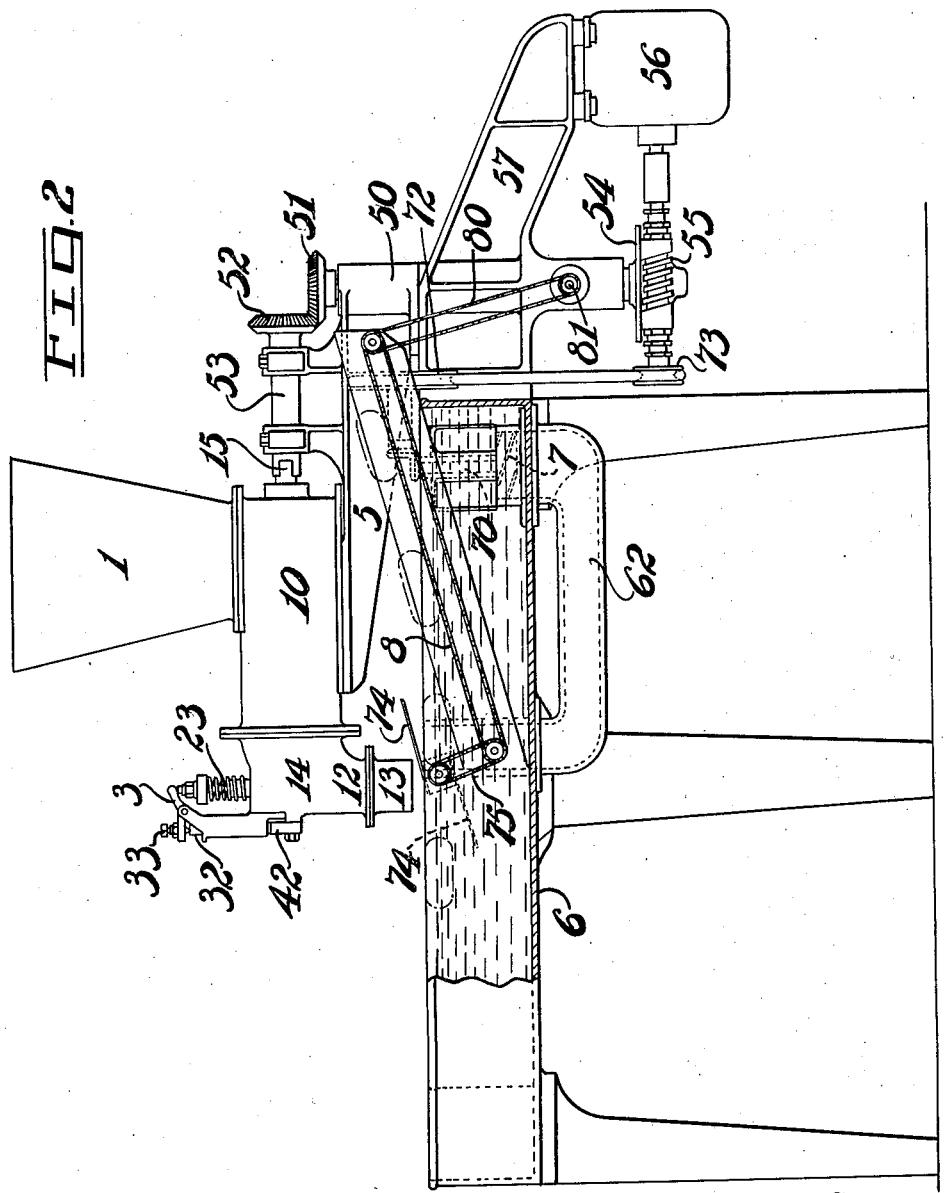

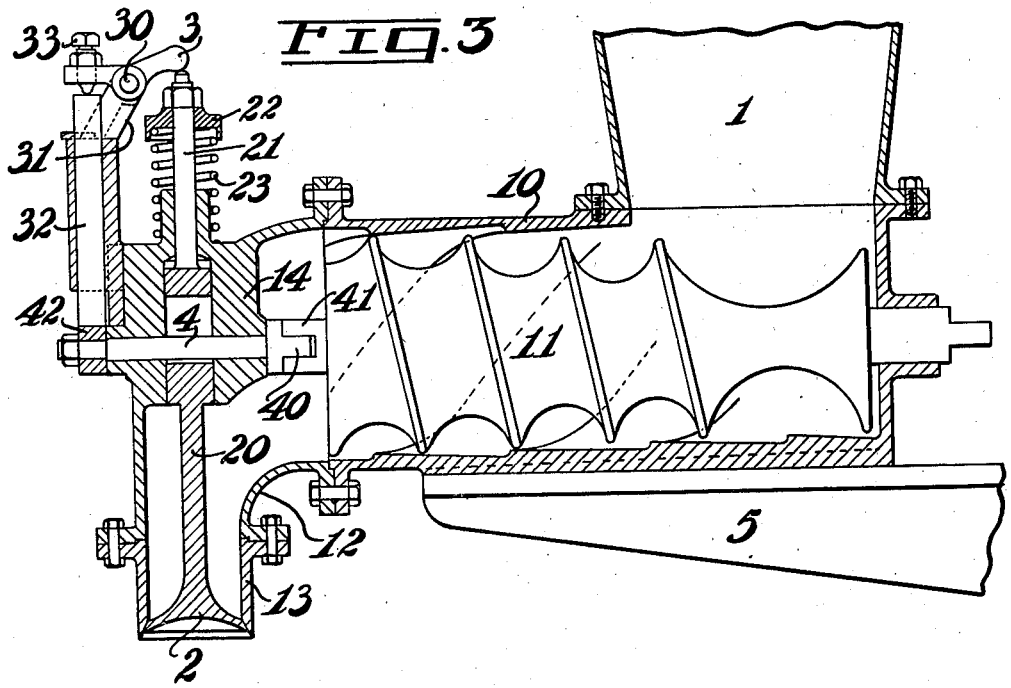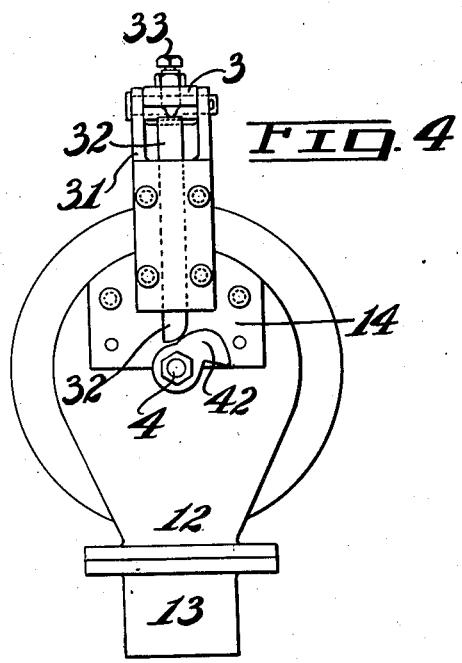

Patented Feb. 19, 1924.

1,484,179

UNITED STATES PATENT OFFICE.

HARRY A. McCLURE AND HENRY F. HUNTLEY, OF SEATTLE, WASHINGTON, ASSIGNORS TO WASHINGTON AUTOMATIC DOUGHNUT MACHINE COMPANY, OF SEATTLE, WASHINGTON, A CORPORATION OF WASHINGTON.

DOUGHNUT MACHINE.

Application filed September 24, 1921. Serial No. 502,899.

*To all whom it may concern:*

Be it known that we, HARRY A. MCCLURE and HENRY F. HUNTLEY, citizens of the United States of America, and residents of the city of Seattle, in the county of King and State of Washington, have invented certain new and useful Improvements in Doughnut Machines, of which the following is a specification.

Our invention relates to a machine which forms and bakes doughnuts or other articles which are cooked in fat.

The object of our invention is to provide a machine of this sort which shall be of a simple construction, with parts easily accessible and renewable and which will have a capacity for forming and baking a large number of doughnuts with a minimum of attention.

The features of our invention which we believe to be new and upon which we desire to secure a patent will be hereinafter described and then particularly pointed out in the claims.

The accompanying drawings show our invention in the type of construction which we now desire to use.

Figure 1 is a top or plan view of the machine.

Figure 2 is a side elevation with a portion of one of the side walls broken away.

Figure 3 is a longitudinal section through the feed worm or screw and the mechanism by which the dough is ejected in proper form to make a doughnut.

Figure 4 is an outer end view of the device shown in Figure 3.

In the type of machine to which ours belongs the material from which the doughnut is made is provided in the form of a thick batter or thin dough of such consistency that it can be forced through pipes using a screw as the impelling agent, and then formed into rings, which rings of dough are dropped into hot fat and is left therein a sufficient length of time to properly bake them.

This machine is provided with a hopper or bin 1 into which the prepared batter or dough is placed. At its lower end this communicates with a horizontally disposed sleeve 10 within which is a feed screw 11 rotating in such manner as to force the dough from the hopper to the opposite end of the sleeve 10. At the opposite end of the sleeve the casing is closed except for a downwardly extending spout 12 through which the dough is forced. This spout may be caused to terminate in a removable and changeable tip, as 13, the lower end of which is shaped to function as a valve seat.

The valve, as 2, is provided of a size to close the opening in the discharge spout. This valve and its seat are positioned so that the valve opens by a downward movement. The stem 20 of this valve extends upward and passes through the upper wall of the casing and has an exterior portion 21 without the casing. A central portion 24 of this valve stem is in the form of a yoke which spans the cam rod 4. A cap 22 serves as one abutment for a spring 23 which, pressing against the casing and said cap, serves to normally hold the valve 2 closed.

A lever 3 is pivoted at 30 upon an arm 31 which extends upwardly from the part 14 which closes the discharge end of the sleeve 10. This arm 31 in its lower portion is provided with a guide for a reciprocating rod 32. This rod is placed in alinement with a shaft 4 which is placed coaxial with the feed screw 11 and is turned therefrom in any suitable manner. The manner illustrated consists in giving the end of the rod 4 a flattened section 40 which will fit between the two side jaws 41 carried by the screw. This permits separation of the parts for cleaning and any other purpose.

The shaft 4 projects from the casing and has secured thereto an operating cam 42 which engages with the lower end of the rod 32 to raise it at each revolution. This rod is alined with one end of the lever 3 so as to raise said end and depress the opposite end. This opposite end of the lever is alined with the end of the valve stem 21 so as to depress it and thus open the valve 2 to permit the discharge of a quantity of dough. The ring of dough thus formed is cut off from the remainder of the dough when the valve closes and drops into the hot grease which is below it.

One end of the lever 3 has an adjusting screw 33 extending therethrough and provided with a lock nut by which it may be adjusted and securely held in adjusted position. This bolt is so positioned as to engage with the end of the reciprocating member which engages that end of the lever. As illustrated the latter is the rod 32, although the adjusting nut might be placed in the opposite end of the lever to cooperate with the valve stem 21.

The dough hopper and the feed screw with its casing and the mechanism above described for forming the doughnut, are all mounted upon a bracket arm 5 which is pivoted at 50 to a vertical shaft upon the upper end of which is a bevel gear 51 which meshes with a companion bevel gear 52 carried by a horizontally positioned shaft 53 which is placed to engage with the end of the feed screw 11. As illustrated these two shafts are connected together by means of a flat end on one which passes between two jaws carried by the other, in the manner described for connecting the shaft 4 with the other end of the feed screw. When it is desired to do so the arm 5 may be swung around so as to be removed from over the kettle which contains the fat and in which the doughnuts are baked.

The vertical shaft to which the gear 51 is secured has at its lower end a worm gear 54 which is operated from a worm 55 secured to or operated by the shaft of the small motor, as 56, which is carried beneath an arm 57. This arm is secured to a table or frame the upper portion of which is composed of the tank 6 in which is placed the hot grease for the baking of the doughnuts. This tank may be heated in any suitable way as by gas, electricity, or by the burning of solid fuel.

This tank has a spiral partition 60 which extends from its bottom to a level above that of the fat contained in the tank. A pipe or conduit 62 connects the center of this spiral with a compartment 63 into which the outer end of the channel formed by said spiral discharges. At this point a pump 7, illustrated as being of revolving propeller wheel type, is placed, which receives the oil from the tank and forces it to the center, thus causing a circulation which flows around the spiral channel formed by the partitions 60. The doughnuts are thus caused to float from the point where they are deposited to the discharge point. Intermediate of this distance is the doughnut turning means consisting, as illustrated, of a two bladed wheel so positioned that the doughnuts will float over one of the blades and thus be transferred from one side to the other thereof and also turned, being deposited in the second portion of the channel.

The pump 7 may be driven in any suitable manner. As illustrated this is driven through the intervention of two shafts, one vertical directly secured to the wheel 7, and the other at 71 placed horizontal and at one end carrying a bevel gear which meshes with a complemental gear carried by the vertical shaft 70. The horizontal shaft is shown as turning through belt pulleys 72 and 73 carried one by the shaft 71 and the other by the worm shaft.

As the doughnuts reach the outer end of the spiral channel, they float upon the inclined chains 8 which have a slow movement and are conducted out of the grease and allowed to drain. They may then be cared for in any convenient manner. This chain is shown as driven through a chain 80 which connects with a shaft 81 driven from the vertical shaft of the worm wheel 54. The doughnut turning blades 74 are operated through a short chain 75. The spiral partition 60 may be loose in the sense that it may be lifted out of the kettle when desired.

What we claim as our invention is:

1. In a doughnut forming machine, a batter conduit, a feed screw therein, a discharge spout connecting with said conduit, a shaft coaxial with and rotatable by said feed screw, and projecting outside of said conduit, a valve independent of said shaft for closing said discharge spout, and means operable from said shaft for controlling the opening and closing of said valve.

2. In a doughnut forming machine, a batter conduit, a feed screw therein, a discharge spout connecting with said conduit, and directed at an angle thereto, a shaft coaxial with and rotatable by said feed screw, and projecting outside of said conduit, a valve closing said discharge spout, and having its stem angularly positioned relative to the shaft, means operable from said shaft for controlling the opening and closing of said valve, and means permitting adjustment of said first means to vary the duration of said valve's opening.

3. In a doughnut forming machine, a dough hopper, a horizontally extending feed screw for feeding the dough from said hopper, a downwardly facing discharge spout, a valve normally closing said spout, the stem of said valve extending upwardly through its casing, a spring surrounding the valve stem exterior of said casing, a pivoted lever engageable with said stem to open the valve, a plunger rod engaging said lever to operate it, a shaft forming an extension from the feed screw and a cam mounted on said shaft and actuating said plunger rod.

4. In a doughnut machine, a dough hopper, a horizontally placed feed screw connecting at one end with the hopper, a casing for said screw having a downwardly extending discharge spout at the delivery end of the screw, a downwardly opening valve normally closing said spout and having a stem extending upwardly through the casing, said stem having a yoke alined with the axis of the worm, a spring engaging the upper end of the stem to normally hold the valve closed, a lever engaging with said stem to open the valve, a rod mounted to reciprocate on said casing and engaging the other end of the valve to operate it, a shaft coaxially placed with the feed screw and having a clutch engagement therewith and a cam secured on said shaft and engaging the reciprocating rod to actuate it.

Signed at Seattle, King County, Washington this 19th day of September, 1921.

HARRY A. McCLURE.
HENRY F. HUNTLEY.